United States Patent [19]
Kaady et al.

[11] Patent Number: 5,259,084
[45] Date of Patent: Nov. 9, 1993

[54] CAR WASH MITTER ASSEMBLY

[75] Inventors: Charles M. Kaady, Portland; Robert E. Bowman, Beaverton, both of Oreg.

[73] Assignee: Kaady Chemical Corporation, San Leandro, Calif.

[21] Appl. No.: 5,338

[22] Filed: Jan. 19, 1993

[51] Int. Cl.⁵ .............................................. B60S 3/06
[52] U.S. Cl. ................................. 15/97.3; 15/DIG. 2
[58] Field of Search ....................... 15/97.3, DIG. 2, 4

[56] References Cited

U.S. PATENT DOCUMENTS

| | | | |
|---|---|---|---|
| 3,499,180 | 3/1970 | Hurwitz | 15/97.3 |
| 3,683,441 | 8/1972 | Fromme | 15/97.3 |
| 3,914,818 | 10/1975 | Fromme | 15/97.3 |
| 3,931,658 | 1/1976 | Evans | 15/97.3 |
| 4,164,053 | 8/1979 | Shelstad | 15/97.3 |
| 4,439,883 | 4/1984 | Hanna | 15/97.3 |
| 4,462,133 | 7/1984 | Hanna | 15/97.3 |
| 4,567,620 | 2/1986 | Hanna | 15/97.3 |
| 4,852,199 | 8/1989 | Holbus | 15/97.3 |

FOREIGN PATENT DOCUMENTS 3335911 4/1985 Fed. Rep. of Germany.

Primary Examiner—Edward L. Roberts
Attorney, Agent, or Firm—Eugene D. Farley

[57] ABSTRACT

A rotary, overhead car wash mitter assembly for use in a car wash station. The assembly comprises a pair of mitter units, each unit comprising a mitter curtain assembly. Mounting structure mounting the mitter units on a support structure above the wash station, opposite each other and each overlying one side portion of the wash station. A motor connected to the mitter units rotate them at a substantially continuous speed in opposite directions of rotation.

10 Claims, 5 Drawing Sheets

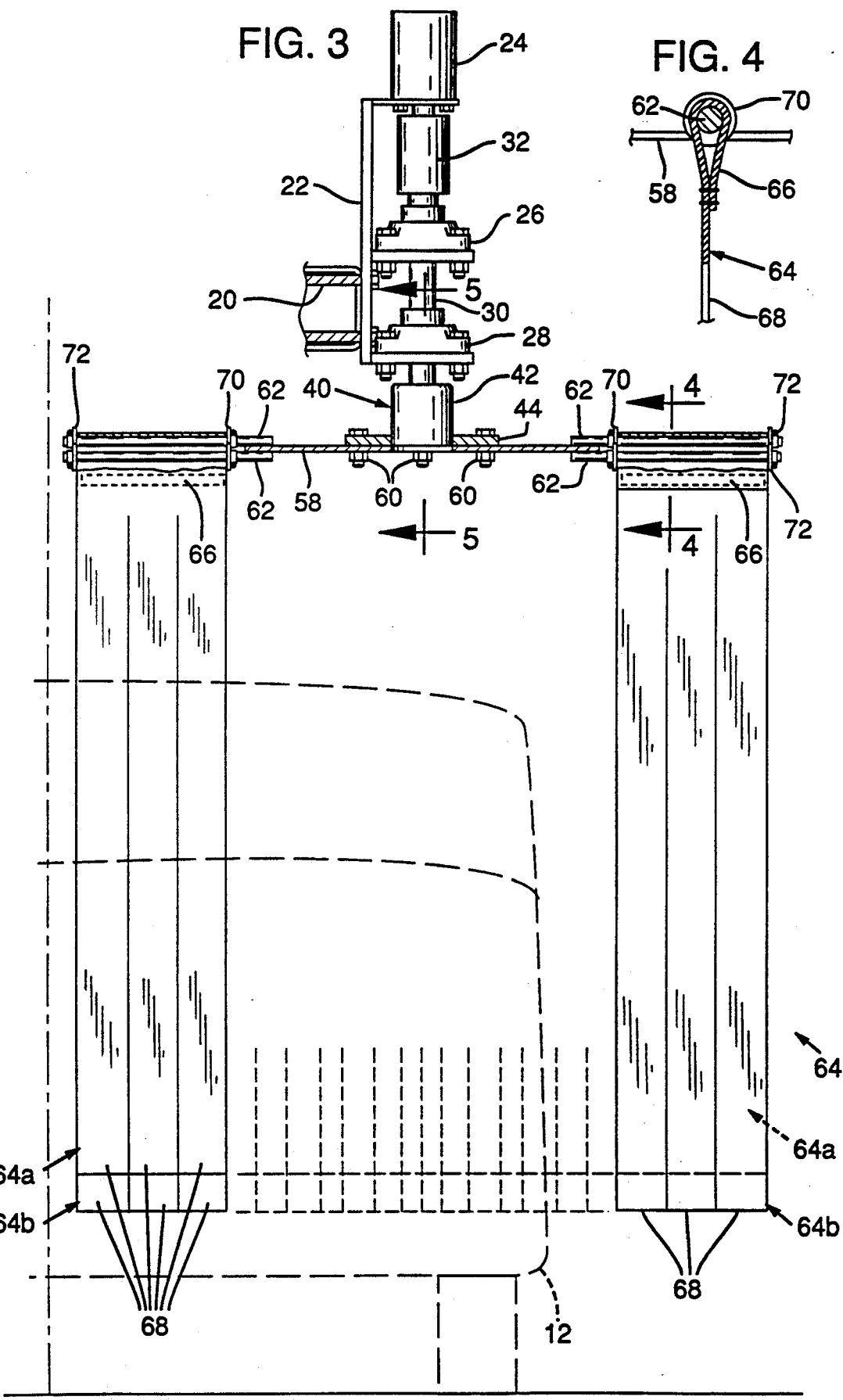

CAR WASH MITTER ASSEMBLY

This invention relates to car wash mitter assemblies.

BACKGROUND AND GENERAL STATEMENT OF THE INVENTION

In the early days, automotive vehicles were washed by hand. The service people who performed this task commercially were equipped with large, spongy mittens or mitts with which they scrubbed the vehicle. As time went on, and mechanized units took over the functions of such personnel, the mechanized units were named "Mitters" because of the analogy of function.

Such units now are widely employed commercially in various styles and operating designs. Almost universally, they employ a plurality of "mitter curtains" consisting of a wide length of carpeting, heavy fabric, chamois or a plastic material divided into long strips and applied to the vehicle to be washed with a reciprocating or oscillating motion. Although widely used, because of the diversity of the vehicles to which they are applied, the speed with which they are operated, and their reciprocating or oscillating motion, various and assorted problems still attend their use.

Among these problems may be mentioned their complexity and high cost, their tendency to mechanical failure because of the high speed of their operation, particularly in torque situations; the tendency of the mitter curtain strips to become entangled with each other and "ball-up"; and the tendency of such strips to slam against or spiral around vehicle mirrors, windshield wipers, radio antennae, outside lights and tires, and other projecting appurtenances with which a vehicle may be equipped. Also, there are areas such as roof overhangs and sloping surfaces which they do not reach effectively.

It accordingly is the general purpose of the present invention to provide a car wash mitter assembly which overcomes in large measure the foregoing problems associated with the mitter assemblies of the prior art.

It is another important purpose of the present invention to provide such a mitter assembly which is simple in design, of relatively low manufacturing and operating cost; adaptable for use with a wide variety of automotive vehicles; and of long service life.

Generally stated, the rotary, overhead, car wash mitter assembly which accomplishes the foregoing and other purposes of the invention comprises in combination with an elevated supporting structure, at least one pair of rotating mitter units ("orbitals"). Each unit comprises a mitter curtain assembly including a plurality of mitter curtains.

Mounting means rotatably mount the mitter units on the supporting structure above the vehicle throughway, opposite each other. Each mitter unit overlies one side portion of the throughway and accordingly of the vehicle which is the subject matter of the washing procedure. Motor means connect to the mitter units for rotating them at a relatively slow, substantially continuous speed, in opposite directions of rotation. Preferably, there are two pairs of counter rotating mitter units.

There thus is provided for the first time a mitter assembly comprising elevated, slowly rotating "orbitals" which are mounted above the vehicle and which wash effectively all of its surfaces substantially without damage to projecting appliances, or to the mitter components themselves.

BRIEF DESCRIPTION OF THE DRAWINGS

FIG. 3 is an enlarged sectional view of one of the mitter units comprising the assembly.

FIG. 4 is a fragmentary, detailed, sectional view taken along line 4—4 of FIG. 3.

DESCRIPTION OF A PREFERRED EMBODIMENT OF THE INVENTION

Figure 1:
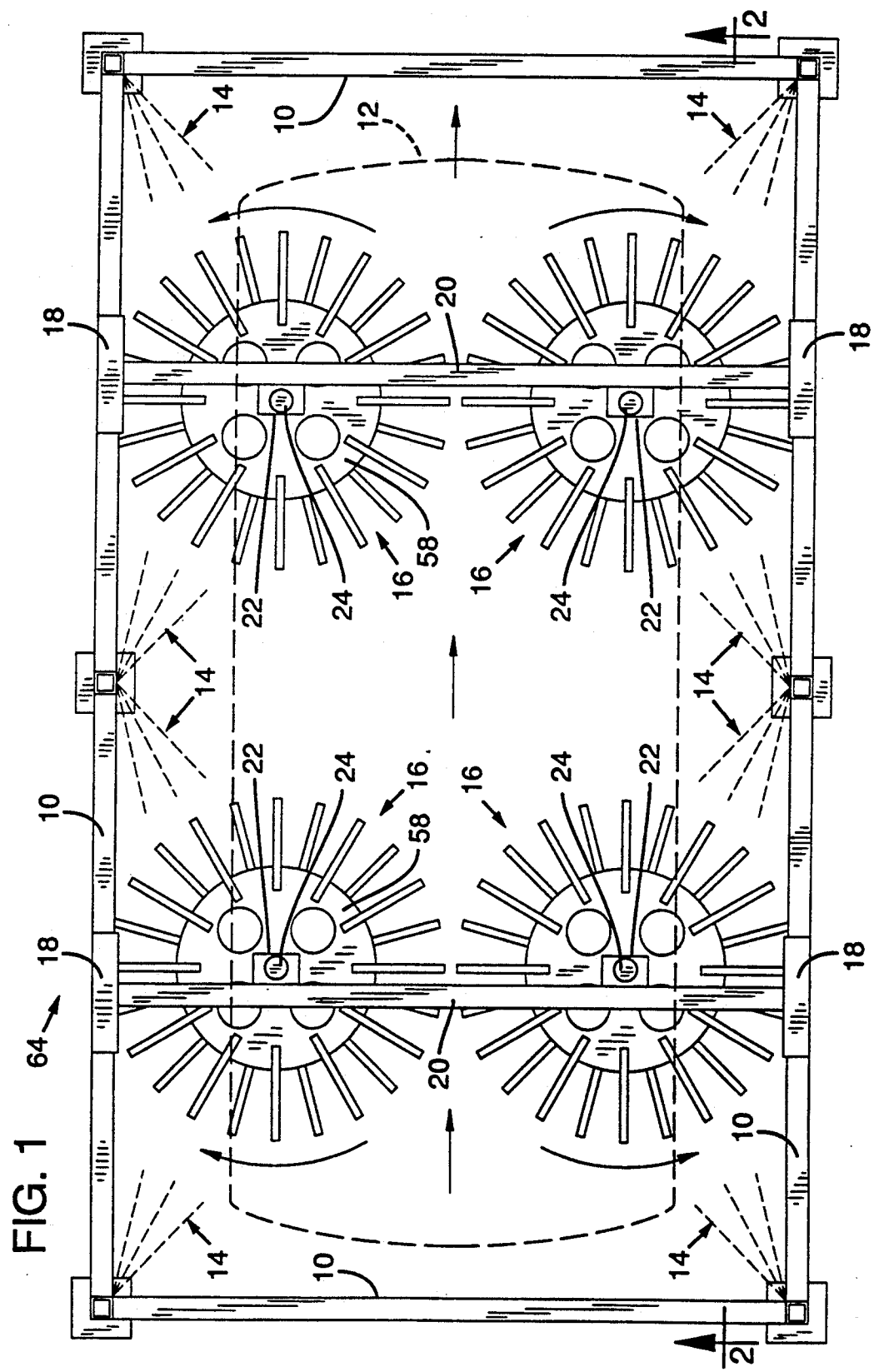
FIG. 1 is a plan view of the herein described car wash mitter assembly.
Figure 2:
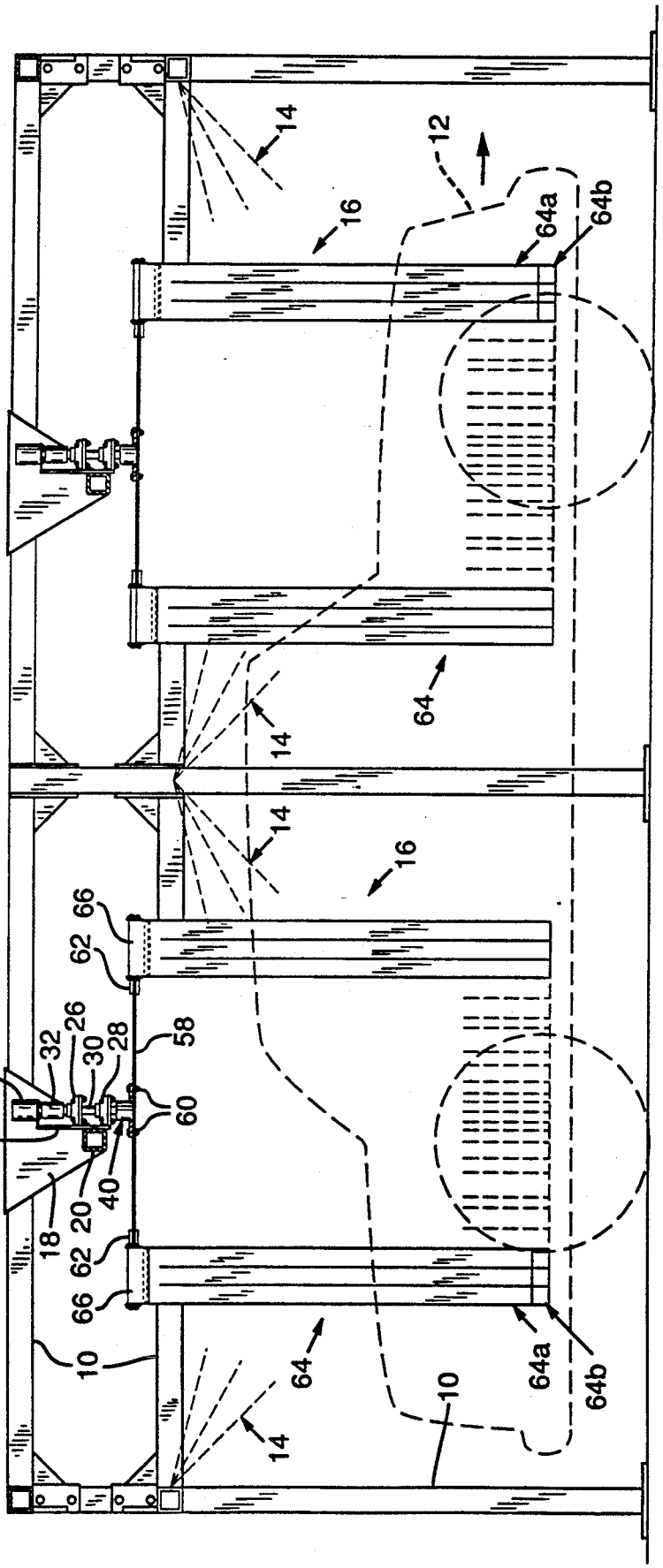
FIG. 2 is a sectional view taken along line 2—2 of FIG. 1.

Referring to FIGS. 1 and 2 of the drawings, the rotary, overhead car wash mitter assembly of our invention is illustrated mounted on a frame 10 which defines a throughway or washing station for a vehicle 12 which is to be the subject matter of the washing operation appropriately located spray heads 14 supply the necessary water.

In the preferred procedure, the vehicle is driven through a stationary throughway, as illustrated. However, it is to be understood that it is within the contemplation of the invention that the vehicle may be stationary in a washing station in which it is subjected to traversal by a reciprocating washing unit.

Frame 10 supports a plurality of mitter units ("orbitals") 16, four in the preferred and illustrated embodiment. These are arranged to provide two pair of counter-rotating assemblies which, accordingly, will operate on the vehicle in both the pass-through or driving direction and the direction opposite thereto to insure that the working elements of the mitter unit will contact effectively all parts of the vehicle. It should be noted, however, that although two pairs of mitter units comprise the preferred assembly, but a single pair may be employed if circumstances dictate the desirability of so doing.

It will be noted further that the mitter units are mounted on the frame opposite each other with each mitter unit overlying one side portion of the throughway and accordingly one side portion of the vehicle. Each mitter unit is supported in a vertical orientation on a heavy support plate 18 which is bolted or otherwise secured to the frame. Plate 18 in turn supports a stout horizontal arm 20. A vertically disposed, triple deck bracket 22 is bolted to the arm.

Bracket 22 supports on its upper deck an electric or hydraulic rotary motor 24. It supports on its intermediate and lower decks a pair of vertically aligned bearings 26, 28.

A vertical drive shaft 30 is connected to the shaft of motor 24 by means of coupling 32. It is journaled in bearings 26, 28.

Figure 7:
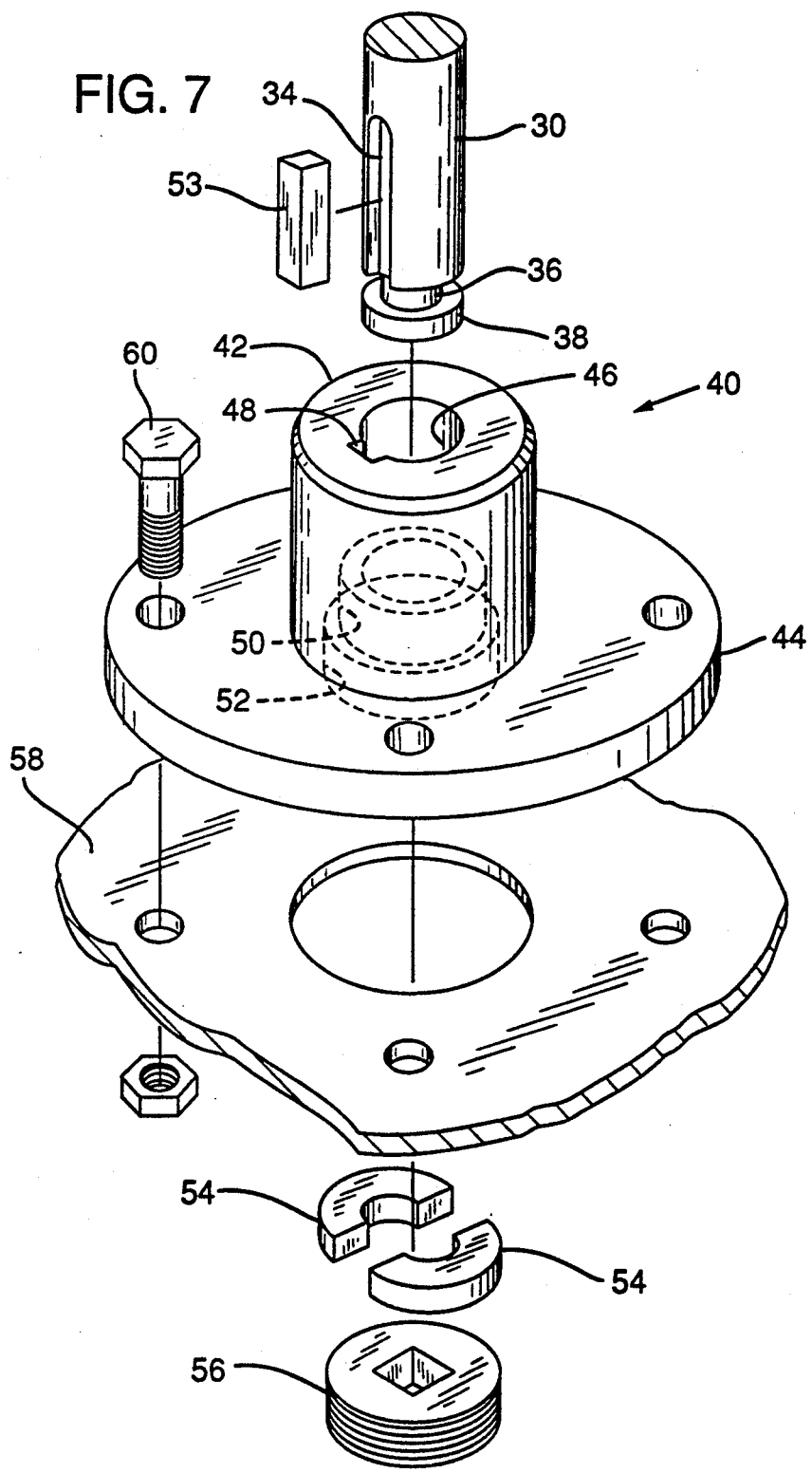
FIG. 7 is an enlarged, exploded view of a hub assembly employed to support and drive each mitter unit.

The lower end of shaft 30 is provided with a longitudinally extending keyway 34, an annular groove 36 and, at its lower end, a terminal land 38, FIG. 7.

Shaft 30 supports and drives in rotary motion a hub indicated generally at 40 and consisting of an upper body part 42 and an integral attaching flange 44.

Hub body 42 has a longitudinal bore 46 incorporating a longitudinal keyway 48. At its lower extremity, bore 46 terminates in a pair of stepped recesses, an upper recess 50 of restricted diameter and a communicating lower recess 52 of enlarged diameter. Recess 52 is internally threaded.

A key 53 seats in keyway 34 in the lower end of shaft 30 and in keyway 48 in hub body 42. It provides the means of keying the shaft to the hub for securing rotation of the latter.

Figure 5:
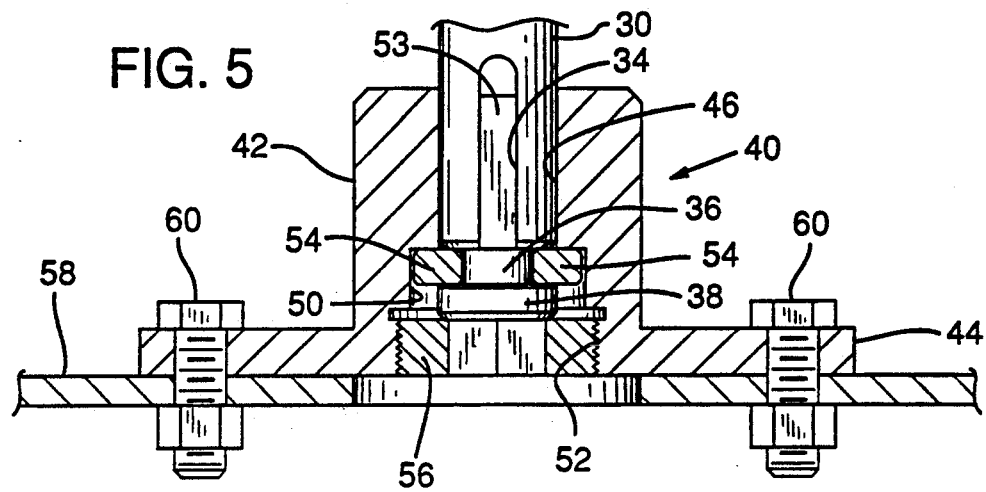
FIG. 5 is an enlarged, detailed, fragmentary, sectional view taken along line 5—5 of FIG. 3.

Keeper means are provided for retaining the hub assembly on shaft 30. In the illustrated form of the invention, the keeper means comprises a split ring 54 which is received in part in the groove 36 in the lower end of shaft 30 and in part in upper recess 50 in hub body 52, FIG. 5. It thus provides the bearing surface by means of which the assembly is supported.

A circular hub plate 58 is secured to the face of flange 44 by means of bolts 60. This member of the assembly is of substantial radial extent and is supported in a substantially horizontal position.

A plurality of mitter support arms 62 are fixed to the perimeter of the hub plate in radially extending, circumferentially spaced orientation. In practice, there may desirably be from 18 to 36, preferably about 24, such arms. Each supports a mitter curtain 64, the active cleaning agent of the assembly, fabricated from a single piece of heavy fabric, such as carpeting, chamois, or plastic material.

As shown particular in FIGS. 3 and 4, each mitter curtain comprises an upper suspension segment 66 and a lower mitter strip segment 68.

Figure 6:
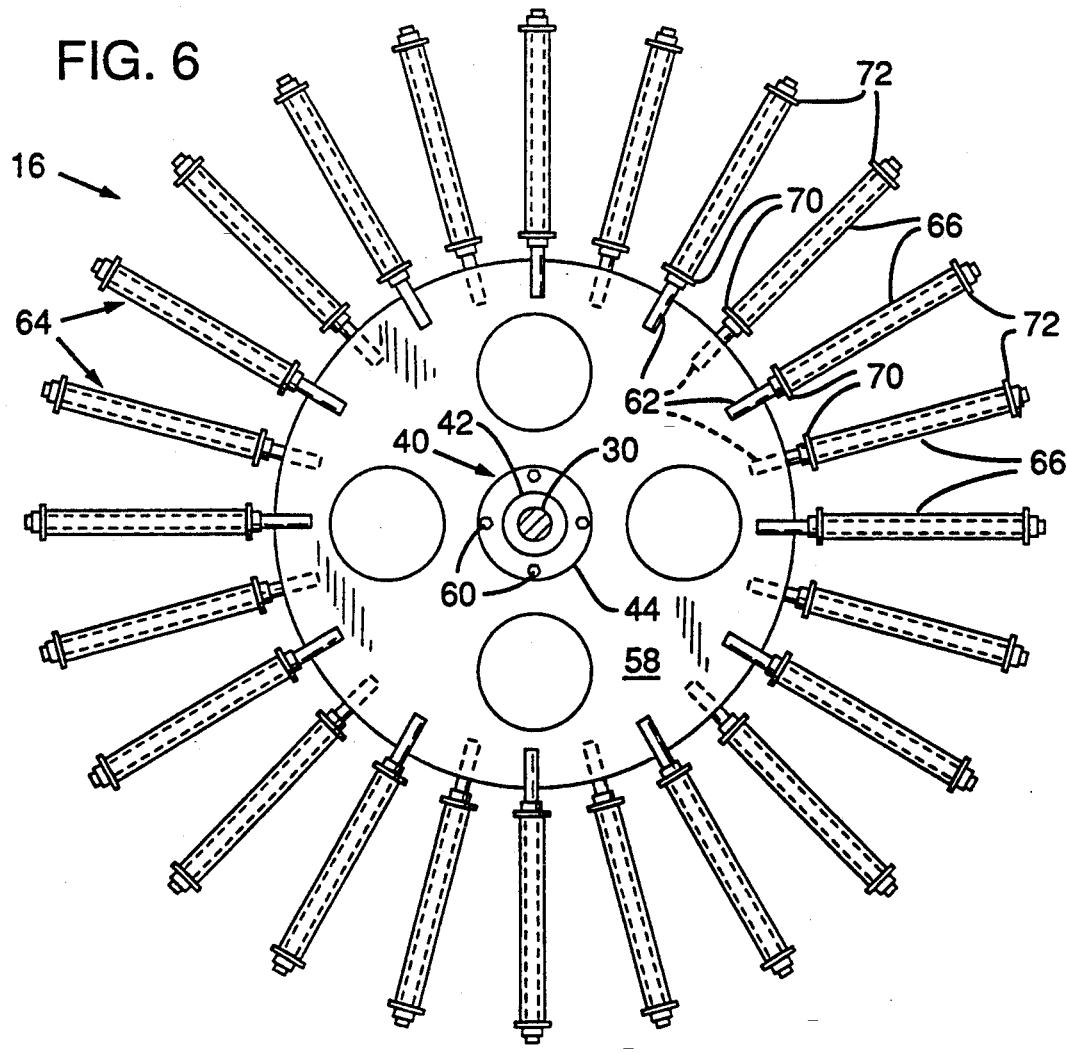
FIG. 6 is a plan view partly in section of the mitter unit illustrated in FIG. 3.

The upper segment 66 is reversely bent to form a loop or sleeve which is telescoped over one of arms 62 where it is held in place between an inner retainer 70 and an outer retainer 72, the latter comprising a washer-nut combination, FIG. 6. This construction makes possible quick curtain change.

The dimensions and arrangement of the mitter curtain are important to the successful operation of the assembly in not snagging, snarling or balling up. We have found that a mitter curtain about 10 inches wide divided longitudinally into strips of substantially equal width operates successfully.

We have also found that it is important to have alternate ones of the mitter curtains of different length. This is of particular importance in preventing the snarling and balling up of the mitter strips. We have found that it is desirable to employ a mitter curtain assembly in which alternate curtains 64a are from about 2% to about 10% shorter in length than their companion curtains 64b, FIG. 3.

The dimensions of the assembly thus should be such that the mitter units are arranged opposite each other with each overlying one side portion of the washing station. This is accomplished by providing a hub plate-support arm combination having a diameter of from 60 to 74 inches, preferably about 66 inches.

The length of the mitter curtains should be such that the mitter curtains are from 12 to 36 inches off the floor. If they are longer, tangling and car damage problems ensue. If they are shorter, they do not clean effectively.

OPERATION

In the operation of the mitter assembly, the vehicle 12 is driven slowly through the throughway provided by frame 10.

Two pairs of mitter units 16 ("orbitals") preferably are employed. These are arranged to substantially overlie the vehicle, one component of each pair being located forwardly and the other rearwardly of the vehicle.

Direct drive motor 24 is energized to rotate the orbital slowly, at a rotational speed of from 12 to 22 rpm. To rotate it faster creates unpleasant noise and causes damage to both vehicle and mitter assembly.

It is a feature of the invention that the orbital is rotated at a slow speed substantially continuously. This eliminates torque, thereby preventing stress damage to the mitter assembly components. It also subjects all vehicle and accessory surfaces to the cleansing action of mitter strips 68.

The cleansing action is particularly effective and thorough because the strips contact the vehicle in both the line of travel of the vehicle and in the direction opposite thereto. The vehicle surfaces are subjected to a continuous wiping action from overhead, lengthwise, from side-to-side, and from all angles. An effective washing job thus is accomplished, without hazard to personnel, and with minimum damage to equipment.

Having thus described in detail a preferred embodiment of the present invention, it will be apparent to those skilled in the art that various physical changes may be made in the device described herein without altering the inventive concepts and principles embodied. The present embodiment is therefore to be considered in all respects as illustrative and not restrictive, the scope of the invention being indicated by the appended claims.

We claims:

1. A rotary, overhead car wash mitter assembly designed for use in a car wash vehicle throughway, the assembly comprising:
    an overhead supporting structure,
    a pair of mitter units, each unit comprising a mitter curtain assembly,
    mounting means mounting the mitter units on the support structure above the throughway, opposite each other and each substantially overlying one side portion of the throughway, and
    motor means connected to the mitter units for rotating them at a substantially continuous speed in opposite directions of rotation.

2. The mitter assembly of claim 1 wherein there are two pairs of mitter units positioned with reference to the vehicle throughway for sequential traversal by the vehicle.

3. The mitter assembly of claim 1 wherein each mitter curtain assembly includes a plurality of mitter curtains in radial disposition and circumferentially spaced from each other, alternate curtains being shorter than their companion curtains by increments predetermined to minimize tangling interengagement of the curtains.

4. The mitter assembly of claim 3 wherein each curtain component of the curtain assembly is about 10 inches in width and is divided longitudinally into three mitter strips of substantially equal width.

5. The mitter assembly of claim 3 wherein each curtain component of the curtain assembly is about 10 inches in width and is divided longitudinally into three mitter strips of substantially equal width and alternate ones are from about 2% to about 10% shorter in length than their companion strips.

6. The mitter assembly of claim 1 wherein the mitter curtain assembly includes a plurality of radially extending, circumferentially spaced support arms and wherein each mitter curtain comprises an upper suspension segment and a lower mitter strip segment, and including attachment means for attaching the suspension segment to the support arm.

7. The mitter assembly of claim 6 wherein the attachment means comprises a reversely bent portion of the suspension segment, forming a loop dimensioned to receive the support arm in mitter curtain-suspending relation.

8. The mitter assembly of claim 1 wherein the mounting means comprises a bracket means attached to the supporting structure, a drive shaft mounted vertically and rotatably on the bracket means, coupling means coupling the upper end of the shaft to the motor means, hub means connected to the lower end of the shaft, and a plurality of radially-extending, circumferentially-spaced arms attached to the hub means, each arm supporting one of the mitter curtains of the mitter curtain assembly.

9. The mitter assembly of claim 8 wherein the hub means comprises a recessed hub keyed to the lower end of the shaft, keeper means for retaining the hub on the shaft, and a horizontal hub plate mounting the radially extending arms.

10. The mitter assembly of claim 9 wherein the keeper assembly comprises split ring-lock nut means.

* * * * *